United States Patent [19]

Miyake et al.

[11] 4,302,424
[45] Nov. 24, 1981

[54] ISOTOPE SEPARATION

[75] Inventors: Tetsuya Miyake, Suginami; Norito Ogawa, Yokohama; Kohji Inada, Yokohama; Kunihiko Takeda, Yokohama, all of Japan

[73] Assignee: Asahi Kasei Kogyo Kabushiki Kaisha, Osaka, Japan

[21] Appl. No.: 167,495

[22] Filed: Jul. 11, 1980

Related U.S. Application Data

[62] Division of Ser. No. 941,505, Sep. 11, 1978, Pat. No. 4,280,984.

[30] Foreign Application Priority Data

Sep. 14, 1977 [JP] Japan .................. 52-109858

[51] Int. Cl.³ ............... B01J 49/00; B01D 59/30
[52] U.S. Cl. .................... 422/159; 210/134; 210/190; 210/253; 210/264; 422/111; 422/903
[58] Field of Search ............ 23/230.6; 422/111, 112, 422/159, 190, 903; 210/682, 253, 264, 134, 135, 142, 97, 137, 190, 191

[56] References Cited

U.S. PATENT DOCUMENTS

| | | | |
|---|---|---|---|
| 3,312,617 | 4/1967 | Klein | 210/190 |
| 3,953,569 | 4/1976 | Seko et al. | 423/7 |
| 4,049,548 | 9/1977 | Dickerson | 210/253 |
| 4,092,398 | 5/1978 | Miyake et al. | 423/7 |

FOREIGN PATENT DOCUMENTS 309059 11/1967 U.S.S.R. ............... 210/253

OTHER PUBLICATIONS

Spedding, F. H. et al., "A Laboratory Method of Separating Nitrogen Isotopes by Ion Exchange", J. Amer. Chem. Soc. 77:6125–6132, 1955.

*Primary Examiner*—Ernest G. Therkorn
*Attorney, Agent, or Firm*—Sprung, Felfe, Horn, Lynch & Kramer

[57] ABSTRACT

An isotope separation apparatus comprises a plurality of independent developing units, each comprising 2 to 20 adsorbent-packed columns forming a continuous developing circuit or passageway, and the developing units are connected to at least one common main pipe for supplying an isotope mixture solution, a regenerating agent solution, or an eluent solution. Also, in a further embodiment the developing units are connected to common liquid-discharge main pipes.

The separation or concentration of isotopes such as uranium isotopes, nitrogen isotopes, boron isotopes, etc., is performed by continuously developing the isotope mixture solution passed through the individual adsorbent-packed columns successively in each developing units.

7 Claims, 5 Drawing Figures

ISOTOPE SEPARATION

This is a division of Application Ser. No. 941,505, filed Sept. 11, 1978 now U.S. Pat. No. 4,280,984.

BACKGROUND OF THE INVENTION

1. Field of the Invention

The present invention relates to an apparatus for separating isotopes. More particularly, it relates to an apparatus for separating isotopes using a plurality of developing units connected to at least one liquid-supply main pipe.

2. Description of the Prior Art

In separating and concentrating an isotope from a mixture of isotopes on an industrial scale, a desired amount of separation and concentration thereof is generally obtained by combining a large number of separation units in the form of a network called a "cascade" since the separation factor of a single isotope separator is usually very small. For example, Kunio Higashi; *Uranium Concentration* (published by Nikkan Kogyo Shinbun Sha in 1971) teaches that in the case of producing 5% concentrated uranium-235 using natural uranium as the raw material by a gaseous diffusion method, it is necessary to form a cascade by combining, in series, separation units composed of 902 concentration stages and 500 recovery stages. Also, in the case of producing the uranium isotope on an industrial scale by gas centrifuging, it is necessary to form a cascade by combining, both in series and in parallel, several hundred thousands of centrifuges per plant and the entire separation apparatus used for this purpose is complicated and hard to control.

For example, either the cascade of 1400 stages in the gaseous diffusion unit or the cascade of several hundred thousand centrifuges acts as one separation apparatus where the stream of uranium hexafluoride gas in each stage must be accurately controlled in order to maximize the separation factor of the uranium isotope. Furthermore, if a part of a large number of the separation units shuts down, the resulting disturbance of the gas stream or the concentration of isotopes would extend all through the cascade. For recovering under the optimum separation conditions, complicated calculations and operation control may be required. Still further, in order to slightly change the uranium isotope concentration of a product by the operation, the concentration must be changed by controlling the operation conditions of each of the many separation units while trying to maximize the separation factor of the cascade.

In separating an isotope on an industrial scale, it has been a common observation that several thousands to several hundred thousand separation units must be assembled into one cascade, which causes various difficulties in operation.

SUMMARY OF THE INVENTION

An object of this invention is, therefore, to provide a novel isotope separation apparatus which can overcome essentially the above-described difficulties in operation control.

Another object of this invention is to provide a process of separating various kinds of isotopes using the novel apparatus.

That is, according to this invention, there is provided an isotope separation apparatus comprising at least two developing units, with each developing unit comprising at least two adsorbent-packed columns forming a continuous circuit and with each developing unit being connected to at least one common liquid-supply main pipe through flow control devices.

Also, according to another embodiment of this invention, there is provided an isotope separation process which comprises supplying a solution of an isotope mixture to each of the developing units of the above-described isotope separation apparatus through one of the above-mentioned common liquid-supply main pipes.

BRIEF DESCRIPTION OF THE DRAWINGS

FIG. 1 shows a typical embodiment of the isotope separation apparatus of this invention;

DESCRIPTION OF THE PREFERRED EMBODIMENTS

An isotope separation process in a single developing unit which is the fundamental means of this invention is first described in detail, and then an industrial scale isotope separation apparatus comprising a number of such developing units and the operation procedure of the apparatus are explained.

It is known in the prior art that an adsorption zone of an isotope mixture is formed in a developing column packed with an adsorbent and the isotope adsorption is developed with a switable eluent, whereby isotopes are separated while the adsorption zone migrates through the column. For example, according to the processes described in Japanese Patent Application (OPI) Nos. 12,700/'72; 57,297/'74, etc., a developing column packed with an ion exchange resin is regenerated beforehand with an appropriate oxidizing agent or a reducing agent, a uranium adsorption zone is formed in the column, the uranium is developed by an eluent such as an aqueous solution of an oxidizing agent, a reducing agent, etc., to form a concentration gradient of the uranium isotopes in the uranium adsorption zone, and the portion of the adsorbed uranium having the desired composition is collected from the column. Also, F. H. Spedding, "Laboratory Method of Nitrogen Ion Separation of Ion Exchange Resin", *J. Amer. Chem. Soc.*, 77, 6125–6132 (1955) describes in detail a process in which an aqueous ammonium hydroxide solution containing nitrogen isotopes $^{14}N$ and $^{15}N$ is passed through a cation exchange resin-packed column which has been washed and regenerated beforehand with a dilute mineral acid to form an ammonium adsorption zone and the adsorption zone is developed using an aqueous sodium hydroxide solution as the eluent to form an isotope concentration gradient in the adsorption zone.

Also, according to the investigations by the inventors of the present invention, boron isotopes can be separated in the same manner. That is, after a column packed with a strongly basic anion exchange resin has been regenerated with an aqueous strong alkali solution such as an aqueous sodium hydroxide solution, an aqueous solution of boric acid containing boron isotopes $^{10}$B and $^{11}$B is passed through the column to form a boric acid adsorption zone. Then, the boric acid adsorption zone is developed using an aqueous strong acid solution as the eluent, whereby a concentration gradient of the boron isotopes is formed in the adsorption zone. In this method, the anion exchange resin-packed column, once used for the development and in equilibrium with the aqueous strong acid solution as the eluent solution, is regenerated with an aqueous strong alkali solution as the regenerating agent solution, so that the column can be used again for adsorption and development.

Exemplary strong alkalis which can be employed as the regenerating agent in this invention include sodium hydroxide, potassium hydroxide and ammonia solution. Exemplary strong acids which can be employed as the eluent in this invention include inorganic acids such as hydrochloric acid, sulfuric acid, phosphoric acid and nitric acid, and organic acids such as acetic acid and formic acid.

As is clear from the above description, the general procedure of separating isotopes from a mixture thereof using a developing column packed with an adsorbent is:

(1) to regenerate the packed column to a suitable state for the development of an adsorption zone of the isotope mixture, (2) to form an adsorption zone of the isotope mixture in one end of the packed column, (3) to develop the adsorption zone in the column with a suitable eluent to form a concentration gradient of the desired isotope in the adsorption zone, and then (4) to collect the portion of the adsorbed isotope having a desired concentration from the adsorption zone.

When the separation of isotopes is carried out in such a manner as described above, to concentrate the isotope to a desired concentration the adsorption zone must be developed along a distance of several meters to several hundreds of meters due to the very low separation factor of isotopes and, further, the amount of the isotope obtained in one operation is usually very small.

As is clearly understandable, it is difficult to provide such a long developing distance with a single adsorbent-packed column. Furthermore, when a large amount of isotopes are separated on an industrial scale, the amount of isotopes which can be collected in one development is limited, and accordingly it is necessary to repeatedly perform a large number of developments.

In order to avoid such difficulties, adsorbent-packed column units having an appropriate length obtained by dividing a developing distance of, generally several tens to several hundreds of meters are prepared and a developing apparatus can be set up by connecting the adsorbent-packed column units to one another in series through conduits. Such a developing apparatus of the in-series type is operated in the following manner.

That is after the entire developing apparatus has been regenerated with a regenerating agent solution, an isotope adsorption zone is formed in the first adsorbent-packed column unit and developed by an eluent solution. After the migration of the isotope adsorption zone to the second adsorbent-packed column unit has been completed, the first adsorbent-packed column unit is regenerated with a regenerating agent solution and again an isotope adsorption zone can be formed.

In the same manner, the isotope adsorption zone in the second adsorbent-packed column unit is developed with an eluent solution and the isotope adsorption zone successively migrates into the third, the fourth and the subsequent adsorbent-packed column units. At this time, the second, the third, and the subsequent adsorbent-packed column units through which the initial isotope adsorption zone has passed must be regenerated with a regenerating agent solution. In repeating these procedures it is possible to perform development within a necessary or desired distance using adsorbent-packed units successively connecting a large number of adsorption zones in series.

When the above described developing apparatus is set up, the developing distance extends over several hundreds of meters and accordingly, several tens to several hundreds of adsorbent-packed column units are used. It is not easy to connect in series such a large number of adsorbent-packed column units through multi-way valves and to appropriately control the entire system. Since a large number of adsorbent-packed column units are connected in series one another, a shutdown even in one adsorbent-packed column unit affects the operation of the entire system and to prevent such an accident each adsorbent-packed column unit must be provided with, for example, a bypass line. Clearly, the developing apparatus needing such consideration becomes much more complicated and, as a result, its operation and control becomes more difficult.

According to this invention, the above-described single adsorbent-packed column can be divided into a plurality of developing units having 2 to several tens of adsorbent-packed columns and, by independently operating and controlling each developing unit, isotopes of a desired concentration can be separated and collected while developing an isotope adsorption zone. An example of a developing unit performing such a developing operation is illustrated in FIG. 1 of the accompanying drawings shown as 13 or 13' wherein adsorbent-packed columns are connected to multi-way valves, conduits, and liquid-supply and liquid-discharge pipes. In such a developing unit, a continuous developing circuit is formed among the adsorbent-packed columns of the developing unit, whereby regeneration takes place in one column while adsorption or development is conducted in other columns. If the regeneration is completed, the column is further used for the subsequent adsorption and elution steps. That is, by performing the regeneration, adsorption and elution steps in three columns, an isotope-adsorption zone can be developed for an infinite distance through the continuous developing circuit in one developing unit. When the adsorption zone of an isotope mixture is developed using such an operation, an isotope concentration gradient is formed in the zone due to the interaction between the isotopes and the adsorbent. The isotope concentration gradient increases with increased developing distances. When the isotope concentration gradient of the adsorption zone reaches a desired value after the adsorption zone is developed to a sufficient distance, the isotope of a desired composition can be collected with an eluent from the system using an appropriate means such as by switching flow directions by valve operation. The remaining adsorption zone having an insufficient isotope concentration can be further concentrated to a desired extent by further developing the adsorption zone in the developing unit. Moreover, by supplying an isotope mixtuure to the adsorption zone in the column in an amount corresponding to that of the isotopes removed from the column, the total amount of the isotope mixture in the adsorption zone can be always maintained at the same value. That is, the isotope adsorption zone formed in a part of a plurality of adsorbent-packed columns of the developing unit can be developed along an infinite distance in the developing unit by alternately repeating the regeneration, adsorption and elution operations in the adsorbent-packed columns forming the developing unit, while collecting suitably the isotope enriched portion having the desired concentration of the adsorption zone from the column and supplying at the same time an isotope mixture in the same amount as the collected amount to the adsorption zone. Thus, the isotope can be separated in a suitably concentrated state from the isotope mixture.

The superiority of the developing units according to this invention over the above-described developing apparatus composed of adsorbent-packed column units, each connected in series, is obvious. Using the developing units of this invention, each of the developing units forms a closed circuit by a continuous developing circuit whereby adsorbent-packed columns are connected to one another, and a predetermined amount of isotopes can be separated and collected by infinitely circulating an isotope adsorption zone in the closed circuit. Therefore, each of the developing units can be independently operated and controlled, and, as a result, the procedures of operation are simple and an accident or shutdown in one developing unit does not affect the operation of other developing units. The developing units can be provided in parallel depending upon the scale of the plant and the design and construction of the plant for the separation of isotopes become very easy. These advantages cannot be expected of the above-described conventional developing apparatus of the in-series type.

The present invention provides an industrial scale isotope separation apparatus, which can be controlled easily in a simple manner by combining a plurality of such a developing unit as described above in detail. That is, according to this invention, by connecting the above-described developing unit to the liquid-supply main pipes for a regenerating agent solution, an isotope mixture solution, and an eluent solution through flow rate regulators, the isotope separation can be performed independently in each developing unit while supplying thereto the solution from liquid-supply main pipes. In this case, pumps do not need to be provided for each developing unit for supplying and circulating the solutions, since each solution to the developing unit is supplied through liquid-supply main pipes. In an extreme case, the isotope separation apparatus comprising a plurality of developing units can be operated by equipping one liquid-supply pump to each liquid-supply main pipe. This is one of the remarkable advantages of this invention.

The advantage of this invention will be further clarified by comparing a conventional isotope separation apparatus and the isotope separation apparatus of this invention. In separating uranium-235 by the conventional gaseous diffusion method as described previously, about 1400 separation units, each comprising one compressor and one diffuser, must be connected in series, and hence 1400 compressors are required in the overall separation system. On the other hand, in this invention, one liquid-supply pump for each liquid-supply main pipe is required for a large number of developing units connected to the liquid-supply main pipes. That is, only three pumps are required in this invention while 1400 compressors are required in the conventional gaseous diffusion system. Generally, a large part of the maintenance work in a plant depends upon the number of rotary machines utilized, so that there is no argument that this invention provides a superior isotope separation process to the conventional separation methods. This comparison is also true for the gas centrifuge process. The superiority of this invention will be clearly understood by comparing the gas centrifuge process using several hundred thousands of high-speed centrifuges with the isotope separation process of this invention using only a few liquid-supply pumps.

In the invention, the developing unit is usually connected to each liquid-supply main pipe through a flow rate regulator. When an adsorption zone is being developed by the stream of an eluent solution, the developing rate of the adsorption zone is proportional to the flow rate of the eluent solution. Also, the isotope separation factor decreases as the developing rate increases. In order to attain the same degree of separation in each developing unit, the developing rate of the adsorption zone is most easily controlled by the flow rate regulator. Each developing unit typically comprises 2 to 20 adsorbent-packed columns, conduits connecting them, and multi-way valves, and hence the flow resistance is not always uniform in each developing unit. Also, the number of adsorbent-packed columns through which an eluent passes at the developing operation changes from time to time, resulting in a fluctuation in the flow rate of the eluent solution even though the eluent is supplied to the developing unit from the liquid-supply main pipe at a constant pressure. In order to avoid this fluctuation, it is desirable to equip each developing unit with a flow rate regulator. As is clear from the above explanation, the flow rate regulator preferably functions to automatically maintain the flow rate of the supplied liquid constant. To supply a solution at a constant flow rate from main pipes to each developing unit, equipping each developing unit with a metering pump must be considered but it is desirable to equip each developing unit with a flow rate regulator rather than a metering pump.

The flow rate regulator which can be employed in this invention is also useful for other purposes. When two sets of developing units, A and B, are connected to the same liquid-supply main pipe and the same isotope mixture solution is supplied to both developing units while obtaining the isotope at different concentrations as the products, it is most desirable to change the developing rate in each developing unit by controlling the flow rates of the eluent solution in each developing unit. In the system as described above, an isotope product with a high separation degree is obtained from the developing unit operating at a low developing rate, while an isotope product with a low separation degree is obtained from the developing unit operating at a high developing rate. As a matter of course, when the developing rate is high, a larger amount of the product is obtained. The developing rate directly influences the concentration of the isotope in the product, and thus, it is desirable to employ a flow rate regulator which can be finely adjusted depending on the concentration of the product. As will be explained hereinafter, the separation efficiency of the entire separation apparatus is reduced by mixing if the isotope products of each unit collected through a common liquid-discharge main pipe having different concentrations. Therefore, when the isotope products from each developing unit are collected in a common liquid-discharge main pipe, the concentrations of the isotope products produced by each developing are desirably maintained unit at the same value. For this purpose, it is particularly preferred to connect a means capable of detecting at any time the concentration of the isotope to each developing unit, and to control precisely the flow rates according to the concentration thus detected. In the case of a uranium isotope separation apparatus, the composition of $^{235}U$ and $^{238}U$ can be quickly determined by measuring the gamma ray spectra, whereby the flow rate of an eluent solution can be automatically controlled according to the concentration detected.

The developing rate of an adsorption zone is an important factor for controlling the operation of the entire separation apparatus. One of the preferred embodiments of this invention is to equip the liquid-supply main pipe with a pressure regulator for reducing the fluctuation of the flow rate during the operation to as small as is possible since the developing rate of the adsorption zone is an important factor for controlling the opeation of the entire apparatus. Various types of pressure regulators can be employed for this purpose. The simplest pressure regulator is one in which the pressure in the main pipe is maintained constant by overflowing a part of the liquid passing through the main pipe across a header provided at the upper portion thereof. However, the pressure in the liquid-supply main pipe should be usually maintained at 10 to 60 kg/cm$^2$, and thus this simple approach is not suitable. One embodiment of the pressure controller which can be used involves equipping the down stream of a liquid-supply pump with a pressure control valve which is adjusted by detecting the pressure in the liquid-supply main pipe. Another embodiment of the pressure controller is a system of supplying excessive liquid from the liquid-supply pipe through the pressure control valve placed in the by-pass line to a liquid-supply tank or the liquid-discharge main pipe.

Generally, three liquid-supply main pipes are employed for solutions such as regenerating agent solution, isotope mixture solution, and eluent solution. However, the solutions are not always supplied from the three systems of the liquid-supply main pipes to the same developing unit. For example, frequently the mass flow of the eluent solution is much larger than that of the regenerating solution or the isotope mixture solution. In such a case, two or more liquid-supply systems for the eluent solution may sometimes be employed per main pipe for each of the regenerating solution and the isotope mixture solution. Also, when a large number of developing units are separated into two groups operated with different isotope compositions as feed materials, two liquid-supply main pipes for an isotope mixture solution of different compositions are employed per liquid-supply main pipe for each of the regenerating agent solution and the eluent solution.

Furthermore, the number of liquid-supply main pipes connected to one developing unit means is not necessarily three. When an adsorbent-packed column in which development has been completed is regenerated by passing a regenerating agent solution through the column, two or more different regenerating agents may be used to reduce the period of time required for regeneration. For example, in a uranium isotope separation procedure using an anion exchange resin as the adsorbent, the packed column in which development has been completed is regenerated using an aqueous solution of an oxidizing agent. In this case, to reduce the regeneration period of time, a method is sometimes employed in which an oxidizing agent solution having a high concentration is first supplied to the column for a short period of time to regenerate the greater part of the anion exchange resin and then an oxidizing agent solution of a suitable concentration is supplied to complete the regeneration of the packed column. In such a case, the liquid-supply main pipes connected to the developing unit are two main pipes for the regenerating agent solutions, one main pipe for an isotope mixture solution and one main pipe for an eluent solution. It is clear that the individual operational control scheme of each developing unit is not basically changed even if the number of liquid-supply main pipes is changed.

The features of this invention have been described above by referring mainly to the liquid-supply systems to each developing unit. Also various techniques in handling the waste solutions discharged from each developing unit can be used. Usually, the waste solution containing the regenerating agent and the waste solution containing the eluent are collected in a liquid-discharge main pipe and discarded therefrom or recycled as it is or after appropriate treatment thereof. For example, in separating uranium isotopes using adsorbent-packed columns with an anion exchange resin, an oxidizing agent and a reducing agent used as a regenerating agent and an eluent, respectively, are deactivated after development and discharged from the developing unit. They are collected in a liquid-discharge pipe and are reused after being activated in an reactivation process. Furthermore, where two different regenerating solutions are used in the regeneration of an ion exchange resin column as described above, at least five liquid discharge main pipes are employed since two liquid-discharge main pipes for the first and the second regenerating agent solutions; one liquid-discharge main pipe for the deactivated regenerating agent and eluent; and at least two products-recovery main pipes are used. Reactivated regenerating agent and eluent are separated from each other and they can be used repeatedly after activating them separately. The operation of the developing units connected in parallel to the liquid-discharge main pipes can be performed without any particular restriction because of the number of pipes used. These liquid-discharge main pipes can be open troughs but usually closed pipes are used for preventing the solution passing therethrough from being contaminated or evaporated and applying an appropriate back pressure to the packed columns. In addition, to stabilize the flow rate in each developing unit to maintain the back pressure thereof can be maintained uniform and hence, if necessary, the pressure in the pipes is maintained by equipping the liquid-discharge pipe with a pressure regulator.

Two liquid-discharge main pipes are usually employed for collecting the isotope-enriched product from the developing unit. An isotope mixture of nitrogen, boron, or uranium, i.e., containing $^{14}N$ and $^{15}N$, $^{10}B$ and $^{11}B$, $^{235}U$ and $^{238}U$ can be separated by the isotope separation apparatus of this invention, and two isotope products are discharged from the apparatus. Further, two or more different products, each containing the same isotope at a different concentration, can be obtained, if desired. One example of this is enriched uranium for a light water nuclear reactor from natural uranium containing about 0.7% $^{235}U$ as the raw material can be obtained. The concentration of $^{235}U$ in the product is selected in the range of 2 to 4% in accordance with this purpose. In such a case, a common liquid-discharge main pipe is connected to each developing unit discharging the same product assay. Isotope products of different assays are recovered separately by each liquid-discharge pipe. Even in this case, the liquid-supply pipes and liquid-discharge pipes for the regenerating agent or the eluent may be connected to the entire developing unit.

The isotope mixtures which can be separated according to this invention are not limited to nitrogen, boron, or uranium isotopes. This invention is also applicable to any isotope mixtures capable of forming an adsorption zone on a pre-regenerated adsorption and wherein an isotope concentration gradient can be developed in the adsorption zone by using a suitable eluent. Examples of such isotopes are isotope mixtures of $^{46}Ti$ and $^{48}Ti$; $^{54}Fe$ and $^{56}Fe$; and $^{206}Pb$ and $^{208}Pb$ in addition to the above-illustrated isotope mixtures.

Any adsorbents which can apparently selectively adsorb thereon part of an isotope mixture in the isotope adsorption zone can be used as the adsorbent in this invention. Examples of such adsorbents are cation exchange resins, anion exchange resins and adsorbents obtained by supporting a substance having selective adsorbability such as crown compounds, liquid ion exchangers, etc. on a porous carrier such as silica, alumina, zeolite, etc. Cation exchange resins used in this invention are not limited, and include, for example, strongly acidic cation exchange resins prepared by introducing sulfo groups into styrene-divinylbenzene copolymers and weakly acidic cation exchange resins prepared by introducing carboxylic groups into styrene-divinylbenzene copolymers, which preferably have a degree of crosslinking of more than about 4%. Anion exchange resins used in this invention include, for example, strongly basic anion exchange resins having quaternary ammonium groups therein prepared by chloromethylating styrene-divinylbenzene copolymerrs, followed by amination; weakly basic anion exchange resins having primary, secondary or tertiary amine groups therein; and nitrogen-containing heterocyclic compounds, which preferably have a degree of crosslinking of more than about 4%.

An example of this invention will be explained in greater detail by reference to the accompanying drawings.

FIG. 1 shows a typical embodiment of the isotope separation apparatus of this invention wherein a developing unit composed of three adsorbent-packed columns are connected to three liquid-supply main pipes and foud liquid-discharge main pipes.

In FIG. 1, numerals 1 to 3 represent storage tanks; numerals 4 to 6 liquid-supply pumps; numerals 7 to 9 pressure regulators, and numerals 10 to 12 liquid-supply main pipes for a regenerating agent solution, an isotope mixture solution, and an eluent solution, respectively. Numerals 13 and 13', each represents a set of developing units and numerals 14, 15 and 16 represent flow rate regulators equipped to the liquid-supply branch pipes 17, 18 and 19, respectively.

The separation of isotopes is explained by referring to FIG. 1. It will be assumed that in the three absorbent-packed columns 23, 24 and 25 of the developing unit 13, a developing operation is being conducted in packed column 24, an adsorption operation is being conducted in packed column 25, and the developing operation has just been finished in packed column 23. Since the subsequent operation of column 23 is the regeneration of the adsorbent, a regenerating agent solution is supplied to column 23 through branch pipe 17 and a multi-way valve 200 to regenerate the adsorbent in column 23. The eluent solution remaining in column 23 is collected in a waste eluent tank 40 through a multi-way valve 260, a liquid-discharge branch pipe 30, and a liquid-discharge main pipe 35. When the eluent solution in packed column 23 is entirely replaced with the regenerating agent solution from the column, the multi-way valve 260 is operated to collect the regenerating agent solution from the column in waste regenerating agent tank 39 through a branch pipe 29 and a main pipe 34.

Packed column 23 whose regeneration has been completed is used in the subsequent adsorption operation. That is, after collecting two different isotope products from the isotope adsorption zone formed in packed column 25 in product tanks 41 and 42, respectively, through a multi-way valve 280, the remaining isotopes in the adsorption zone are sent to column 23 through a continuous developing circuit composed of a valve 280, a continuous pipe 33, and a valve 200. An isotope mixture solution of the same amount removed from column 25 is supplied to column 25 through a liquid-supply branch pipe 13 and a valve 200. The solution thus supplied forms an adsorption zone in column 23 together with the isotopes supplied from column 25. The feeding time of the isotope mixture through the liquid-supply branch pipe 18 as a raw material is so adjusted that is does not disturb the concentration gradient of isotopes circulated from the column 25. To achieve this condition where no mixing occurs a method is employed in which the feeding moment where the isotope concentration of the solution passing through the valve 200 is the same as that of the feed material is selected, while isotope concentration varies from time to time. One method to accomplish this comprises temporarily stopping the flow of isotope solution circulating from column 25 at the feeding moment, and then to supply fresh feed of a suitable amount through the valve 200. The flow of isotope solution from column 25 is then resumed after adding fresh feed. Thus, the regenerating agent solution filled in column 23 by such an adsorption procedure is collected in a waste regenerating agent tank 39 through a valve 260, a liquid-discharge pipes 29 and 34. The adsorption zone of the isotope mixture thus formed in column 23 is developed by the eluent solution to perform a separation of the isotopes. That is, the adsorption zone formed in column 23 flows down slowly through column 23 by the effect of the eluent solution supplied into column 23 through liquid-supply main pipe 12, branch pipe 19, and multi-way valve 200. A slight difference between the apparent migration rate of the isotopes increases the concentration gradient in the adsorption zone. Through the developing operation, the regenerating agent solution or a mixture of the regenerating agent solution and the eluent solution emerging from packed column 23 is collected in a waste regenerating agent tank 39 or a waste eluent tank 40, respectively. When the adsorption zone flowing down through column 23 reaches the bottom thereof, the isotope mixture is sent to column 24 where the regeneration has completed, by operating multi-way valves 260 and 210. Thus the operations for adsorption and developed are continued.

In developing unit 13' in FIG. 1, each numeral having a prime "'" designation has the same meaning as numeral without a prime designation in developing unit 13. For example, numeral 23' denotes an adsorbent-packed column which is the counterpart of numeral 23 in the developing unit 13.

The function of each developing unit is clear from the above explanation. In this invention, a number of such developing units are connected in parallel to the liquid-supply main pipes through flow rate regulators 14, 15 and 16; 14', 15' and 16'; etc. The flow rate regulators control the flow rates of the regenerating agent solution, the isotope mixture solution, and the eluent solution to predetermined values and are particularly important for securing a stable operation of each developing unit. In particular, when the multi-way valve of each column is operated using a timer, an appropriate switch-over time must be maintained to keep the flow rate stable. Also, pressure regulators 7, 8 and 9 equipped in the liquid-supply main pipes are important and effective for this purpose.

The number of the adsorbent packed columns in each developing unit may be suitably selected in the range of 2 to 20. In order to maintain a continuous developing operation, one of the adsorbent packed columns must be in a regeneration operation and one of them must be in a waiting state after finishing the regeneration, and even if the two operations are performed in one column, at least two packed columns are necessary in the same developing unit. If the number of adsorbent-packed columns is larger, the developing operation, that is, the ratio of adsorbent-packed columns used, for isotope separation becomes higher. However, on the other hand, if the number of adsorbent-packed columns increases, multi-way valves, piping, etc. become more complicated increasing the construction cost. Due to such reasons, the number of adsorbent-packed columns used in each developing unit is typically 2 to 20, and preferably 3 to 8.

These adsorbent-packed columns may be disposed on the same level or they may be disposed in the form of a single column. Briefly, the configuration of the adsorbent-packed columns may be designed from the standpoints of reduction in construction cost, and efficiency of working. However, the configuration of the adsorbent-packed columns is considered particularly so that the continuous piping between the first column to the next column is kept as short as possible and at a constant length. When an adsorption zone of isotope migrates from one adsorbent-packed column to the subsequent adsorbent-packed column due to the development operation, the isotope concentration gradient in the adsorption zone is unavoidably reduced to some extent by the disturbance of the liquid stream but the reduction can be kept at a minimum by designing the structure of the adsorbent-packed columns and the piping for connecting the both columns. In order to keep the reduction of the isotope concentration gradient at a minimum, the adsorbent-packed columns are desirably disposed at the same distance and as close as possible. As a practical configuration, the packed columns belonging to each unit developing means are disposed circularly at the same interval or the packed columns are disposed in two or more rows.

Figure 2:
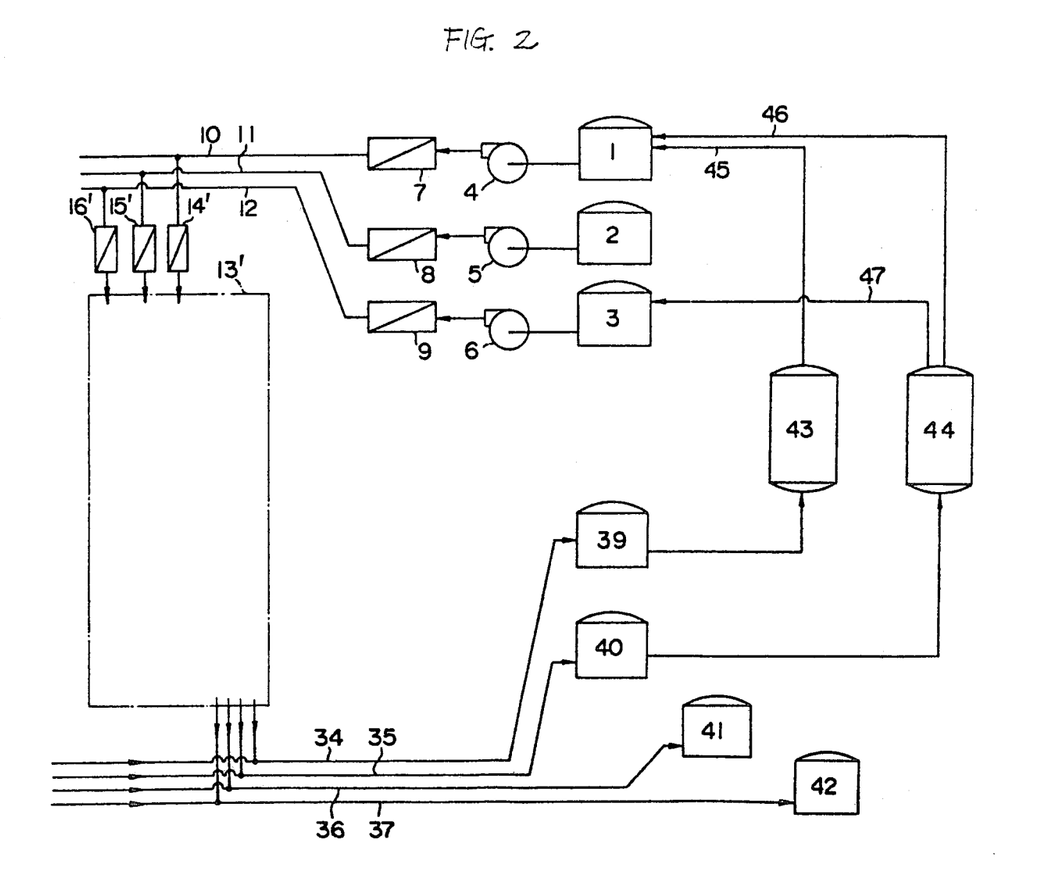
FIG. 2 shows an example of the application of this invention using an activating means for a regenerating agent and an eluent which are employed in addition in the apparatus in FIG. 1.

FIG. 2 shows an example of the application of this invention, in which activating means 43 and 44 for a regenerating agent and an eluent are employed in addition to the apparatus in FIG. 1. A used regenerating solution collected in a waste regenerating agent tank 39 from the developing unit described above is treated in the activating means 43 where impurities in the solution and water therein are removed to adjust the concentration of the solution and then the regenerating agent solution is supplied to a regenerating agent tank 1 through a circulation conduit 45. Also, the eluent collected in waste eluent tank 40 is suppled to eluent tank 3 through activating means 44 and a circulation conduit 47. Frequently, the waste eluent solution gets mixed in a waste regenerating agent solution during regeneration or development but in such a case, both components are separated, purified, and activated in activating means 44 and then are circulated into regenerating agent tank 1 and eluent tank 3, respectively. Also, the activating means may be further connected in various other manners than the one described above depending on the manner of operation of the developing unit.

Figure 3:
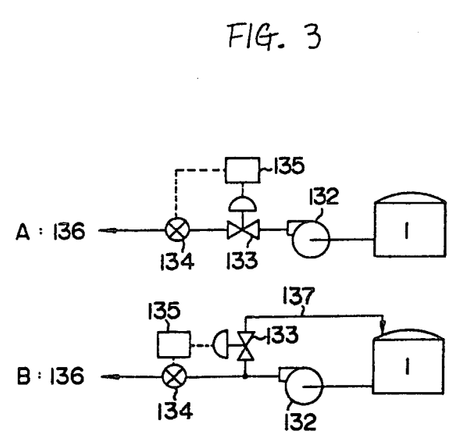
FIG. 3 shows examples of pressure regulators in liquid-supplying main pipes used in the apparatus of this invention.

FIG. 3 shows examples of pressure regulators in liquid-supply main pipes used in this invention. In FIG. 3, A is a system where the flow rate to the main pipe is regulated using a pressure regulating valve and B is a system where an excessive amount of liquid is flowed back to a liquid-supply tank using a pressure regulating valve. In FIG. 3, numeral 1 denotes a liquid-supply tank; numeral 132 a liquid-supply pump; numeral 133 an automatic regulation valve; numeral 134 a pressure detector in main pipe; numeral 135 an automatic valve regulator; numeral 136 a liquid-supply main pipe; and numeral 137 a back flow conduit.

Figure 4:
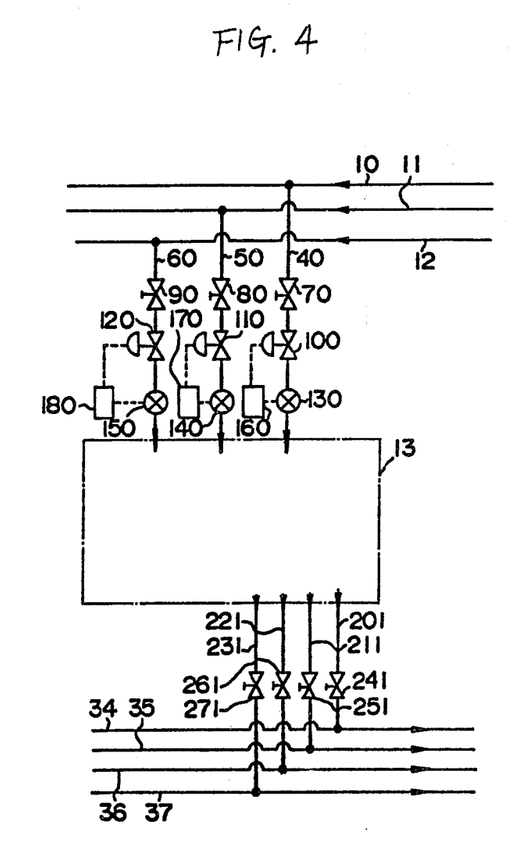
FIG. 4 shows an example of a system of connecting liquid-discharge main pipes and the developing units in this invention.

FIG. 4 shows an example of a system of connecting liquid-discharge main pipes and the developing unit in this invention. In FIG. 4, various solutions are supplied to a developing unit 13 through liquid-supply main pipes 10, 11, and 12, branch pipes 40, 50 and 60, cut-off valves 70, 80, and 90, and automatic flow rate regulators 100, 110, and 120. In addition, numerals 130, 140 and 150 denote flow rate detectors and numerals 160, 170 and 180 denote automatic valve regulators. Waste solutions from the developing units are discharged in liquid-discharge main pipes 34, 35, 36 and 37 through liquid-discharge branch pipes 201, 211, 221 and 231 and cut-off valves 241, 251, 261 and 271.

The cut-off valves provided to the liquid-discharge branch pipes are cutting off the developing unit from the liquid-discharge main pipes for inspection or repairing any accident which might occur in the developing unit, and can be operated by hand or by remote control. One remarkable feature of this invention is that each developing unit can be cut off without any influence on the operation of other developing units.

In separating and concentrating an isotope on a large industrial scale using the isotope separating apparatus of this invention, control of the operation is easy and sure. For example, in concentrating uranium isotope on an industrial scale, several to several thousands of developing units must be used and in such case the separation and concentration of the uranium isotope can be carried out in a stable manner by separately controlling the pressure in the liquid-supply main pipes and the flow rate to each developing unit. The operation of the multi-way valves of each developing unit can be easily performed by employing a simple automatic regulator connected to an automatic analyzer, an integrating indicator for solution flow rate, a timer, etc. For this purpose, various operational control methods of each developing unit can be employed in this invention. Most practically, a concentration detector is provided between one adsorbent-packed column and the subsequent adsorbent-packed column with the continuous developing circuit. The detector detects the front end and the rear end of an isotope solution and the multi-way valve positioning in front of the detector can be appropriately operated by the signals of the detector. At this time, a timer is operated by the signals of the detector, and then the multi-way valve can also be operated after a predetermined period of time upon detection of the front end and the rear end of an isotope solution. Since the flow amount of an eluent solution is precisely proportional to the migration distance of an isotope adsorption zone in an adsorbent-packed column, the multi-way valve can also be operated by the concentration detector in combination with an integrating flow amount of the eluent solution. The control method of using the integrating flow amount of the eluent solution is more precise than that of using a timer, especially when there is a fluctuation in the flow rate of the eluent solution.

Any type of concentration detectors capable of detecting the boundary between a regenerating agent solution and an isotope mixture solution or the boundary between an isotope mixture solution and an eluent solution can be employed in this invention. The concentration detectors which adapt any principle such as electric conductivity, adsorbance, refractive index and oxidation-reduction potential can be employed. Of these detectors, a detector adapting the principle of adsorbance is preferred due to its precision, its shortness in response and its low cost. Since an individual automatic regulating device is employed in each developing unit, a central automatic controlling means for watching or controlling the entire plant is substantially unnecessary in this invention, which is also one of the remarkable features of this invention.

The following examples are given to illustrate the present invention in greater detail.

EXAMPLE 1

Figure 5:
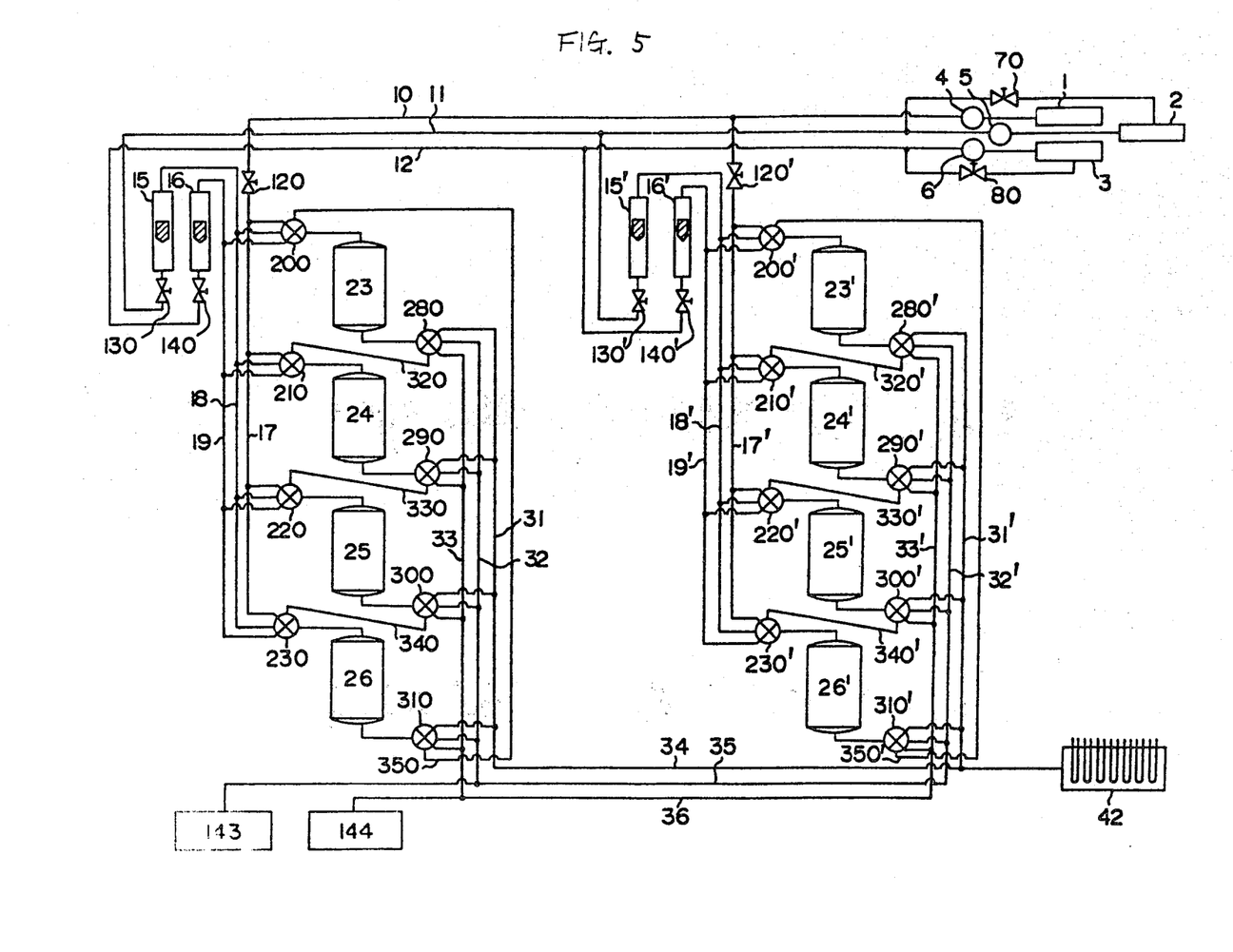
FIG. 5 shows the developing units employed in Example 1 given hereinafter.

Two sets of developing units, each comprising four adsorbent-packed columns as shown in FIG. 5, were prepared. In FIG. 5, numerals 1, 2 and 3 denote storage tanks for an isotope mixture solution, a regenerating agent solution, and an eluent solution, respectively; numerals 4, 5 and 6 liquid-supply pumps; numerals 70 and 80 back pressure valves; and numerals 10, 11 and 12 liquid-supply main pipes. To these liquid-supply systems were connected two sets of developing units comprising four adsorbent-packed columns 23, 24, 25 and 26 and four adsorbent-packed columns 23′, 24′, 25′ and 26′, respectively, through flow rate control needle valves 120, 130 and 140 and 120′, 130′ and 140′, and also flow rate meters 15 and 16 and 15′ and 16′, respectively. In FIG. 5, numerals 200, 210, 220, 280, 290, 300 and 310 and 200′, 210′, 220′,230′,280′, 290′, 300′ and 310′ denote multi-way valves; numerals 17, 18 and 19 and 17′, 18′ and 19′ denote liquid-supply branch pipes; numerals 31, 32 and 33 and 31′, 32′ and 33′ denote liquid-discharge branch pipes; and numerals 320, 330, 340 and 350 and 320′, 330′, 340′ and 350′ denote connecting pipes. Also, numerals 34, 35 and 36 denote liquid-discharge main pipes common to both developing units and the main pipes were connected to a sampling fraction collector 42, a waste regenerating agent storage tank 143, and a waste eluent solution storage tank 144, respectively.

Each adsorbent-packed column was composed of a Pyrex glass-jacketed chromato-tube of an inside diameter of 30 mm and a height of 1200 mm with distributors at both ends, the tube being densely packed with a porous, tertiary amine-type, strongly basic anion exchange resin having an exchange capacity of 0.7 milliequivaelnt/ml. wet resin and a particle size of 100 to 200 mesh (Tyler standard sieve) upto a packed height of 1000 mm.

Then, the isotope mixture solution, the regenerating agent solution and the eluent solution having the compositions shown below were heated to 80° C. in storage tanks 1, 2 and 3, respectively, and supplied to liquid-supply main pipes by means of liquid-supply pumps, 4, 5 and 6, respectively. The excessive solutions thus supplied flowed back to each storage tank through the back pressure valves 70 and 80 and the pressures in the liquid-supply main pipes were always maintained at about 15 kg/cm$^2$. In this case, however, only the liquid-supply pump 4 for the isotope mixture solution was driven only when the solution was supplied to the packed columns.

Isotope Mixture Solution: An aqueous solution of natural uranium containing 0.025 M of uranous chloride and 4.0 M of hydrobromic acid.

Regenerating Agent Solution: An aqueous solution containing 0.05 M of ferric chloride and 4.0 M of hydrobromic acid.

Eluent Solution: An aqueous solution containing 0.05 M of titanium trichloride and 4.0 M of hydrobromic acid.

By using the above described apparatus, the following developing operation was performed. More specifically, the regenerating agent solution was supplied to the resin-packed columns, previously washed sufficiently with an aqueous solution containing 4 M of hydrobromic acid, through valve 130, flow rate meter 15, liquid-supply branch pipe 18, and multi-way valves 200, 210, 220 and 230 to saturate the resin in the columns with ferric chloride. The waste regenerating agent solution from the columns was collected in storage tank 143 through multi-way valves 280, 290, 300 and 310, liquid-discharge branch pipe 32, and liquid-discharge main pipe 35. Then, the isotope mixture solution was introduced into the top of packed column 23 through valves 120 and 200, whereby uranium isotopes were adsorbed on the resin in the column while replacing ferric ions to form an adsorption zone. The flow rate of the uranium-containing solution was controlled in such a manner that the front end of the uranium adsorption zone flowed down through the resin-packed column at a rate of 30 cm/hr. When the front portion of the uranium adsorption zone reached the bottom of column 23, the uranium solution was introduced into column 24 by operating multi-way valves 280 and 210 through connecting pipe 320 to form a uranium adsorption zone in column 24 while replacing with ferric chloride. Then, when the front end of the uranium adsorption zone had reached the lower end of column 24, the supply of the uranium isotope mixture solution was stopped. During the operation, the waste regenerating agent solution from columns 23 and 24 was collected in storage tank 143 through the liquid-discharge main pipe.

Then, the eluent solution was introduced into the packed column through needle valve 140, flow rate meter 16, and multi-way valve 200 and thus the uranium-adsorption zone formed in the previous step was developed in columns 25 and 26. Thus, the uranium-adsorption zone successively migrated to the subsequent column through connecting pipes 330 and 340 and when the front end of the uranium-adsorption zone had reached the bottom of column 26, the zone was flowed back to column 23 through connecting pipe 350. During this step, the regenerating agent solution was introduced into columns 23 and 24, in which development had been completed, through liquid-supply branch pipe 18 by operating successively multi-way valves 23 and 24, whereby the eluent solution remaining in the columns was replaced with the regenerating agent solution for the subsequent development. At this time the used eluent solution was led to waste eluent solution storage tank 144 through multi-way valve 290, liquid-discharge branch pipe 33 and then liquid-discharge main pipe 36.

Thus, after developing the uranium-adsorption zone formed in columns 23 and 24 twice per column or for a total of eight columns, the uranium-adsorption zone was withdrawn from the bottom of column 26 by the operation of multi-way valve 310. The uranium solution thus withdrawn was successively partitioned into 200 ml fractions and collected through liquid-discharge branch pipe 31 and then liquid-discharge main pipe 34 in fraction collector 42, a part of which was subjected to a quantitative analysis of uranium and mass spectrometry of the isotopic analysis of $^{235}U$.

In the fractions thus sampled, the uranium amount and the abundance ratio of $^{235}U/^{238}U$ in the first fraction and the final fraction of the parts containing uranium were as follows.

TABLE 1

| Results of Operation of First Developing Unit | | |
|---|---|---|
| | Uranium Amount (mg) | Abundance Ratio of $^{235}U/^{238}U$ |
| First Fraction | 673 | 0.006829 |
| Final Fraction | 565 | 0.007815 |

The abundance ratio of $^{235}U/^{238}U$ in the natural uranium was 0.007252.

Also, while performing the above described isotope separation operation in the first developing unit, the developing operation of another uranium adsorption zone was performed at the same time in the second developing unit described in FIG. 5. In the second developing unit, each numeral with a prime "'" designation in FIG. 5 denotes the same meaning as the numeral without a prime "'" designation in the first developing unit. For example, numeral 23' denotes an adsorbent-packed column in the second developing unit which is the counterpart of numeral 23 in the first developing unit. In this case, the operation conditions were the same as those in the first developing unit except that the flow rates of the uranium isotope mixture solution and the eluent solution were increased to adjust the migration ratio of the uranium adsorption zone to 20 cm/hr. After developing the uranium adsorption zone to a total distance of 8 meters, the uranium adsorption zone was withdrawn from packed column 26' through the multi-way valve 310' and the uranium solution thus withdrawn was partitioned into 200 ml fractions and collected in fraction collector 42. A part of the fractions was subjected to a quantitative analysis of uranium and mass spectrometry of the isotopic analysis of $^{235}U$. The uranium amount and the abundance ratio of $^{235}U/^{238}U$ in the first fraction and the final fraction of parts containing uranium in the sampled fractions are set forth in Table 2 below.

TABLE 2

| Results of Operation of Second Developing Unit | | |
|---|---|---|
| | Uranium Amount (mg) | Abundance Ratio of $^{235}U/^{238}U$ |
| First Fraction | 741 | 0.006632 |
| Final Fraction | 690 | 0.007981 |

EXAMPLE 2

In each of packed columns 23, 24, 25 and 26 and 23', 24', 25' and 26' of the same isotope separation apparatus as described in Example 1 was densely packed a strongly acid cation exchange resin ("Amberlite 200", manufactured by Rohm & Haas Co.) of 100 to 200 mesh (Tyler standard sieve) at a height of 1000 mm. Then, the isotope mixture solution, the regenerating agent solution and the eluent solution having the composition shown below were stored in storage tanks, 1, 2 and 3, respectively, and supplied to liquid-supply main pipes by means of liquid-supply pumps 4, 5 and 6.

Isotope Mixture Solution: An aqueous solution containing 0.6 M of ammonium hydroxide.

Regenerating Agent Solution: An aqueous solution containing 2 M of hydrochloric acid.

Eluent Solution: An aqueous solution containing 0.6 M of sodium hydroxide.

Excessive portions of the solutions thus supplied flowed back to each storage tank through back pressure valves 70 and 80 and the pressure in the liquid-supply main pipes was always controlled at about 15 kg/cm$^2$. In this case, however, liquid-supply pump 4 only for the isotope mixture solution was driven only when the solution was supplied to the packed columns but was stopped in other cases.

The separation of nitrogen isotopes $^{14}N$ and $^{15}N$ was performed using the above-described apparatus employing the following operations. That is, the ion exchange resin-packed columns were sufficiently washed with the regenerating agent solution. Then, the nitrogen isotope mixture solution, i.e., an aqueous solution containing of 0.6 M of ammonium hydroxide, was introduced into packed column 23 through valves 120 and 200 to form a nitrogen adsorption zone. When the front end of the adsorption zone had reached the bottom of the column, the isotope mixture solution was introduced to packed column 24 through connecting pipe 320 to form also a nitrogen adsorption zone in column 25. Through the adsorption procedure, the flow rate of the isotope mixture solution was controlled by valve 120 in such a manner that the front end of the adsorption zone flowed down through the column at a rate of about 40 cm/hr.

Thereafter, the eluent solution was introduced into packed column 23 through needle valve 140, flow rate meter 16, and multi-way valve 200 to develop the nitrogen adsorption zone formed in the previous step to columns 25 and 26. In this case, the nitrogen adsorption zone successively migrated to the subsequent columns through connecting pipes 330 and 340, and when the front end of the adsorption zone had reached the bottom of column 26, the adsorption zone flowed back to column 23 through connecting pipe 350. The column, in which the developing operation had been completed, was subjected to the regeneration operation as described in Example 1 for the subsequent development.

After developing the nitrogen adsorption zone twice per column or for a total of eight columns as described above, the nitrogen adsorption zone was withdrawn from the bottom of packed column 26 and successively partitioned into 200 ml fractions and collected in fraction collector 42. These solutions thus collected were used as samples for a quantitative analysis of ammonium hydroxide and a mass spectrometry of the isotopic analysis of $^{15}N$.

The ammonium concentration and the abundance ratio of $^{15}N/^{14}N$ in the first fraction and the final fraction of portions containing ammonium hydroxide in the sampled fractions were as follows.

TABLE 3

Results of Operation of First Developing Unit

| | Ammonium Concentration | Abundance Ratio of $^{15}N/^{14}N$ |
|---|---|---|
| First Fraction | 0.53 N | 0.00043 |
| First Fraction | 0.48 N | 0.0298 |

The abundance ratio of $^{15}N/^{14}N$ in the natural ammonium hydroxide used was 0.00365.

Also, while performing the isotope separation described above in the first developing unit, the development of another nitrogen adsorption zone was simultaneously performed in the second developing unit described in FIG. 5. In this case, the operation conditions were the same as those in the first developing unit except that the flow rates of the aqueous ammonium hydroxide solution and the eluent solution were increased to control the migration ratio of the nitrogen adsorption zone to 75 cm/hr. After developing the nitrogen adsorption zone to a total distance of 8 meters, the nitrogen adsorption zone was withdrawn from the system through column 26' and the solution was partitioned into 200 ml fractions and collected in the fraction collector 42. The ammonium concentration and the abundance ratio of $^{15}N/^{14}N$ in the first fraction and the final fraction of portions containing ammonium hydroxide in the sampled fractions were as follows.

TABLE 4

Results of Operation of Second Developing Unit

| | Ammonium Concentration | Abundance Ratio of $^{15}N/^{14}N$ |
|---|---|---|
| First Fraction | 0.49 N | 0.00067 |
| Final Fraction | 0.45 N | 0.0195 |

EXAMPLE 3

In each of packed columns 23, 24, 25 and 26 and 23', 24', 25' and 26' of the same isotope separation apparatus as described in Example 1 was densely packed a strongly basic anion exchange resin ("Amberlite IRA-40", manufactured by Rohm & Haas Co.) of 100 to 200 mesh (Tyler standard sieve) to a height of 1000 mm. Then, the isotope mixture solution, the regenerating agent solution and the eluent solution having the composition shown below were stored in storage tank 1, 2 and 3, respectively, and supplied to liquid-supply main pipes by means of liquid-supply pumps 4, 5 and 6.

Isotope Mixture Solution: An aqueous solution containing 0.5 M of boric acid and an aqueous solution containing 8 percent by weight of glycerol.

Regenerating Agent Solution: An aqueous solution containing 1.0 M of sodium hydroxide.

Eluent Solution: An aqueous solution containing 0.5 M of acetic acid and an aqueous solution containing 8 percent by weight of glycerol.

The supply and the pressure control of the solutions in the liquid-supply main pipes were carried out in the same manner as in Example 1.

The separation of boron isotopes $^{10}B$ and $^{11}B$ was performed using the above-described apparatus employing the same operations as described in Example 2. In this separation all the solutions were maintained at 40° C. That is, in the same manner as in Example 2, a boric acid adsorption zone was formed in ion exchange resin-packed columns 24 and 25 which had been sufficiently regenerated with the regenerating agent solution and subsequently developed with the eluent solution in packed columns 25 and 26. The packed-columns, in which development had been completed, were successively regenerated with the regenerating agent solution for further forming a boric acid adsorption zone therein.

Thus, after developing the boric acid adsorption zone three times per column to a total distance of 12 meters in a migration ratio of about 40 cm/hr as described above, the boric acid adsorption zone was withdrawn from the bottom of packed column 26 and successively partitioned into 100 ml and collected in fraction collector 42. These solutions thus collected were used as samples for a quantitative analysis of boric acid and mass spectrometry of the isotopic analysis of $^{10}B$.

The boric acid concentration and the abundance ratio of $^{10}B/^{11}B$ in the first fraction and the final fraction of portions containing boric acid in the sampled fractions were as follows.

TABLE 5

Results of Operation of First Developing Unit

| | Boric Acid Concentration | Abundance Ratio of $^{10}B/^{11}B$ |
|---|---|---|
| First Fraction | 0.34 M | 0.1229 |
| Final Fraction | 0.36 M | 0.4837 |

The abundance ratio of $^{10}B/^{11}B$ in the natural boric acid used was 0.2438.

Also, while performing the isotope separation described above in the first developing unit, the development of another boric acid adsorption zone was simultaneously performed in the second developing unit described in FIG. 5. In this case, the operation conditions were the same as those in the first developing unit except that the flow rate of the eluent solution was increased to control the migration ratio of the boric acid adsorption zone to 75 cm/hr. After developing the boric acid adsorption zone to a total distance of 12 meters, the boric acid adsorption zone was withdrawn from the system through column 26' and the solution was partitioned into 100 ml fractions and collected in fraction collector 42. The boric acid concentrations and the abundance ratio of $^{10}B/^{11}B$ in the first fraction and the final fraction of portions containing boric acid in the sampled fractions were as follows.

TABLE 6

Results of Operation of Second Developing Unit

| | Boric Acid Concentration | Abundance Ratio of $^{10}B/^{11}B$ |
|---|---|---|
| First Fraction | 0.29 M | 0.1476 |
| Final Fraction | 0.33 M | 0.4026 |

While the invention is described in detail and with reference to specific embodiments thereof, various changes and modifications can be made therein by one skilled in the art without departing from the spirit and scope thereof.

What is claimed is:

1. An apparatus for separating isotopes comprising a plurality of separation units assembled in parallel, each separation unit comprising at least two adsorbent-packed columns in series, valve means for repeatedly circulating an isotope mixture solution through said separation unit, at least one common liquid-supply pipe connected to each separation unit through a liquid flow regulator, and at least one common liquid-discharge pipe connected to each separation unit.

2. The apparatus as claimed in claim 1, wherein each developing unit is connected to three liquid-supply main pipes.

3. The apparatus as claimed in claim 1, wherein the adsorbent is an ion exchange resin.

4. The apparatus as claimed in claim 1, wherein the liquid-discharge main pipe is further connected to a waste liquid activating means.

5. The apparatus as claimed in claim 1, 2 or 3, wherein each developing unit comprises 2 to 20 adsorbent-packed columns.

6. The apparatus as claimed in claim 5, wherein each developing unit comprises 3 to 8 adsorbent-packed columns.

7. The apparatus as claimed in claim 1, 2 or 3, wherein each liquid-supply main pipe includes a pressure regulator.

* * * * *